United States Patent [19]
McMurtry

[11] Patent Number: 4,777,818
[45] Date of Patent: Oct. 18, 1988

[54] COORDINATE POSITIONING APPARATUS

[75] Inventor: David R. McMurtry, Wotton-Under-Edge, England

[73] Assignee: Renishaw plc, Wotton-Under-Edge, England

[21] Appl. No.: 882,972

[22] PCT Filed: May 7, 1985

[86] PCT No.: PCT/GB85/00190

§ 371 Date: Jun. 25, 1986

§ 102(e) Date: Jun. 25, 1986

[87] PCT Pub. No.: WO85/05176

PCT Pub. Date: Nov. 21, 1985

[30] Foreign Application Priority Data

May 4, 1984 [GB] United Kingdom ................. 8411437

[51] Int. Cl.⁴ ......................... G01B 21/00; G01B 7/00; G01D 18/00
[52] U.S. Cl. ........................................ 73/1 R; 73/1 J; 33/503
[58] Field of Search .................... 73/1 J, 1 R; 33/503, 33/556, 558, 559, 561

[56] References Cited

U.S. PATENT DOCUMENTS 4,168,576 9/1979 McMurtry ........................ 33/503 X
4,435,905 3/1984 Bryan .......................... 33/DIG. 1 X
4,437,151 3/1984 Hurt et al. ...................... 364/571 X

FOREIGN PATENT DOCUMENTS 106181 4/1984 European Pat. Off. .
2603376 8/1976 Fed. Rep. of Germany .
2379849 9/1978 France .
1445977 8/1976 United Kingdom .

OTHER PUBLICATIONS

"Measuring Up: Coordinate Measuring Machine Survey"; Tooling and Production; vol. 49, No. 2, May 1983; pp. 40–46 (p. 47 missing).

Primary Examiner—Tom Noland
Attorney, Agent, or Firm—Spencer & Frank

[57] ABSTRACT

A device for checking the accuracy of coordinate positioning apparatus which includes a support, a head and components for measuring the coordinate position of the head relative to the support. The device comprises a bar, a connecting member movably securable to the support, a first universal pivot for supporting the bar at one end on the connecting member, a second universal pivot adapted for establishing a universal pivotable connection between the other end of the bar and the head, and a switch for producing a signal responsive to the head attaining a predetermined location in a coordinate field of the apparatus.

28 Claims, 4 Drawing Sheets

COORDINATE POSITIONING APPARATUS

This invention is for an improvement relating to coordinate positioning apparatus and, more specifically, for a method of and device for checking the accuracy of such apparatus.

BACKGROUND OF THE INVENTION

It is usually required to determine the accuracy of coordinate positioning apparatus, for example coordinate measuring machines, and manual methods exist for doing so. For example, it is known to provide a test bar, operate the machine to measure the length of the bar in different locations of the bar in the coordinate field, and compare the possibly different results obtained at said different locations thereby to establish a measure of the accuracy of the apparatus. The bar itself has to be placed manually into the respective said positions, use being made of a frame or the line to support the bar in those positions. It is an object of this invention to provide a method of and device for checking coordinate positioning apparatus automatically or substantially automatically.

SUMMARY OF THE INVENTION

According to this invention there is provided a method of checking the accuracy of orthogonal coordinate positioning apparatus, the apparatus comprising a support, a head supported for three-dimensional movement relative to the support, and continually operative measuring means for measuring the position of the head in terms of three orthogonal coordinates; the method comprising providing a test bar, universally pivotally connecting the bar at its one end to the support and at its other end to the head, automatically and sequentially moving the head through a plurality of test locations situated about the connection of the bar to the support, the bar undergoing a corresponding angular movement by virtue of its connection to the head, and at each said location measuring the coordinate position of the head as determined by the length of the bar between said ends thereof.

The method according to this invention avoids the need to position the test bar manually and in this way reduces or avoids the difficulties of the known method.

Also according to this invention there is provided a device for checking coordinate positioning apparatus having a support, a head supported for three-dimensional movement relative to the support, and means for measuring the coordinate position of the head; the device comprising a bar, a mounting removeably securable to the support of the apparatus, first pivot means for supporting the bar at one end thereof for universal pivotal motion on said mounting, second pivot means provided at the other end of the bar and adapted for establishing a universal pivotal connection between said other end of the bar and the head of the machine, and means for producing a signal responsive to the head attaining a predetermined location in the coordinate field of the machine.

The device is intended for carrying out the method according to this invention, and said signal is used to effect the reading of said continually operative means for measuring the coordinate position of the head.

DESCRIPTION OF PREFERRED EMBODIMENT

Figure 1:
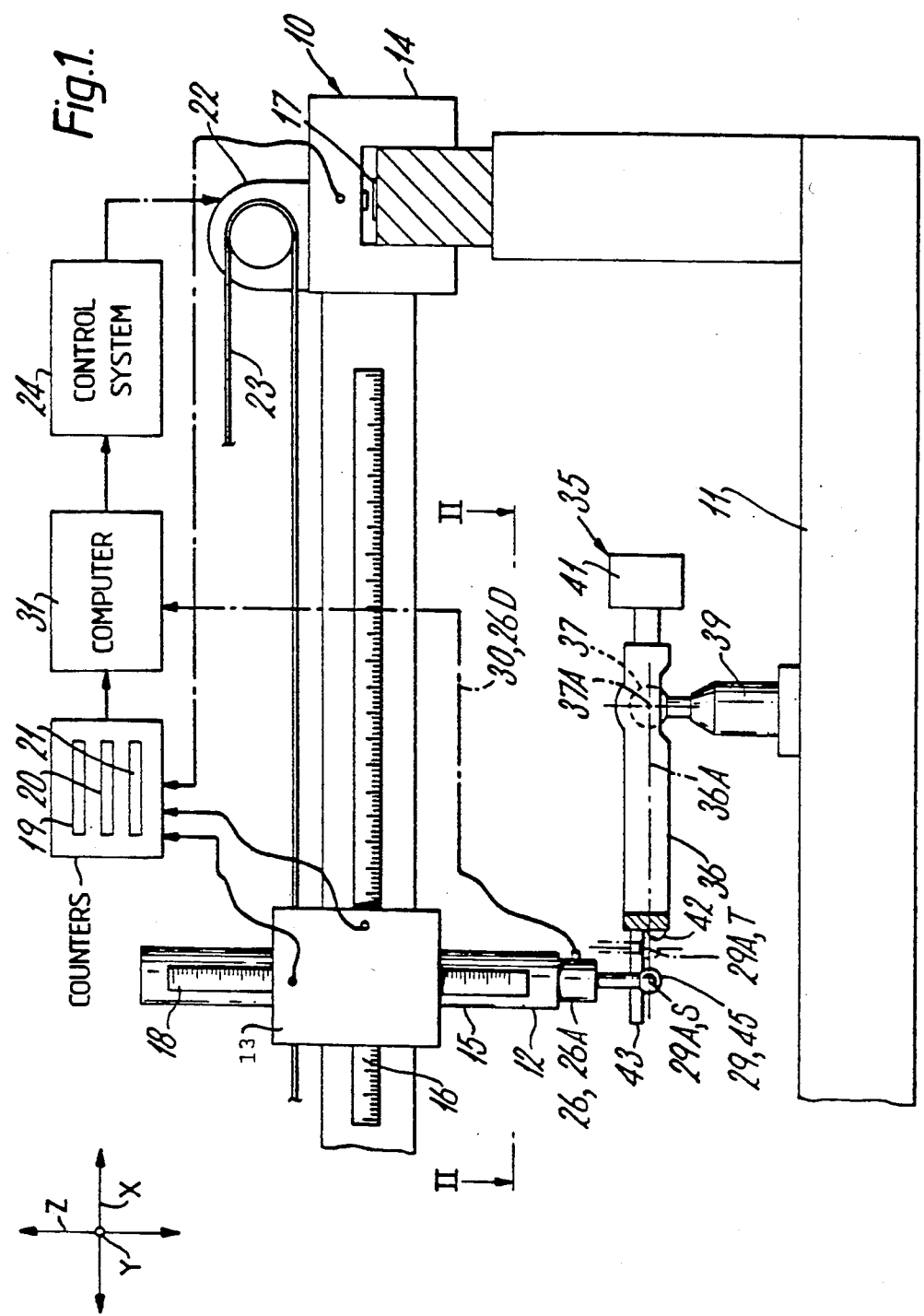
FIG. 1 is an elevation of a coordinate measuring machine and a checking device therefor.

A preferred embodiment of the invention will now be described, by way of example, with reference to the above drawings. Refering to FIG. 1, the coordinate measuring machine, denoted 10, comprises a support or table 11 and a head 12 supported by slides 13,14,15 for three-dimensional movement in the directions X,Y,Z of the orthogonal coordinate system. The Y,Y,Z coordinates of the movement are measurable by continually operative opto-electronic scales 16,17,18 and cooperating counters 19,20,21. The slide movement is producable by motors eg. a motor 22 acting on the slide 13 through a belt 23. The motors eg. 22 are controlled by a control system 24 using the output of the counters as feedback. The control system 24 is operable by a program stored in a computer 31 to move the head to any given position within the range of the machine. The machine 10 is known per se and is normally used for measuring workpieces supported on the table 11.

A probe 26 (FIG. 2) comprises a housing 27 secured to the head 12 and a stylus 28 extending from the housing and having a spherical sensing element 29. Displacement of the sensing element from a rest position relative to the housing 27 causes separation of contacts 26B,26C provided respectively on the housing 27 and the stylus 28 and constituting a switch 26A in an electric circuit 26D. Separation of the contacts 26B, 26C changes the state of the circuit 26D in the sense of producing a signal 30 (FIG. 1) connected to pass the instantaneous content of the counters 19,20,21 to the computer 31. A spring 28A returns the element 29 to the rest position when the displacing force ceases. The probe 26 is known per se eg. from British Pat. No. 1,445,977.

The checking device, denoted 35, comprises a rigid bar 36 supported for universal pivotal motion by a pivot 37 provided at one end of the bar 36. The pivot 37 comprises a spherical head 38 provided at the upper end of a mounting 39 upstanding from and releasably securable to the table 11. The mounting 39 may eg. be secured to the table 11 by releasable clamps (not shown) in the same way as a workpiece to be measured by the machine. The pivot 37 is a kinematic pivot by virtue of three spherical elements 40 secured to the bar 36 to constitute a socket and engaging the head 38 under the weight of the bar 36. The bar 36 is substantially balanced by a counter weight 41. The arrangement is such that the bar 36 can readily be lifted from or placed on to the head 38. The end of the bar 36 adjacent the pivot 37 is defined by the center, 37A, of the spherical head 38.

Figure 3:
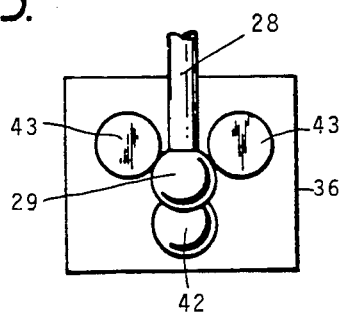
FIG. 3 is a view in the direction of the arrow III in FIG. 2.

At its other end the bar 36 has secured thereto a spherical abutment 42 and a guide means defined by two parallel rods 43 of cylindrical cross-section, as shown in FIG. 3. The abutment 42 lies essentially transverse to the longitudinal axis, 36A, of the bar 36 and the rods 43 extend parallel to the axis 36A. The stylus 28 is engageable with clearance between the rods 43 and the bar 36 is slightly unbalanced so as to engage the rods 43 on to the sensing element 29 with a light force. The sensing element 29 is movable along the rods 43 eg. between positions shown respectively in full and in broken lines and, as shown, the sensing element 29 is engageable with the abutment 42. At the instant of such an engagement the element 29 is displaced from its said rest position and the probe 26 produces the signal 30. The length of the bar is defined by a distance R, between the center 37A of the pivot 37 and the centre, 29A, of the sensing element 29 when the latter is in engagement with the abutment 42 and when the element 29 is said to be in a test location T. The pivot 45 is said to be at a stand-off location S when the sensing element 29 is clear of the abutment 42, eg. by a distance 44A, though still engaged with the rods 43. In this stand-off location of the pivot 45 there is no generation of the signal 30. The rods 43 constitute lost-motion means allowing relative movement of the element 29 and the pivot 37 between the stand-off and the test locations S,T so that strain between the head 12 and the bar 36 is avoided when moving from one test location to the next and the signal 30 is generated only when the test location itself is attained. The stylus 28 can be released from and engaged between the rods 43 at the free ends thereof.

Figure 4:
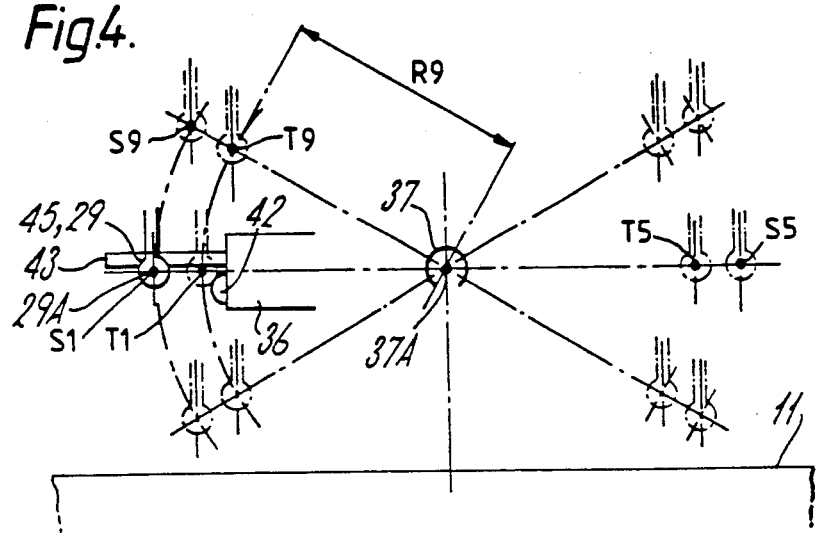
FIG. 4 is a view similar to FIG. 1 in diagrammatic form.
Figure 5:
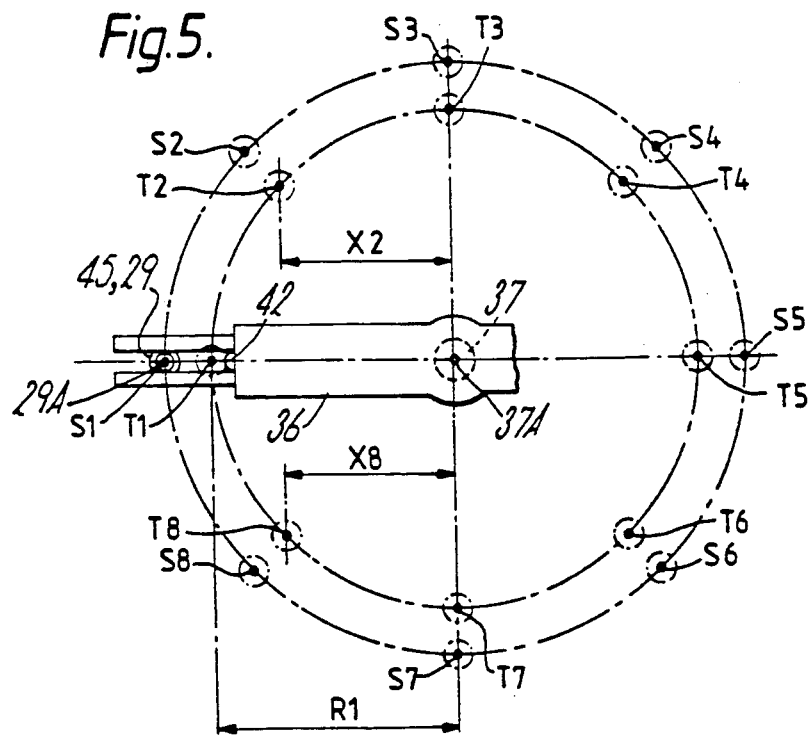
FIG. 5 is a plan view of FIG. 4.

The use of the device 35 will now be described with additional reference to FIGS. 4, 5 which show the element 29 in a first stand-off location S1 adjacent a first test location T1. FIGS. 4, 5 also show an array of other stand-off location S2 . . . Sn and corresponding test locations T2 . . . Tn. The test locations are of course determined by the length of the bar 36 and lie on a notional sphere. Similarly the stand-off locations lie on a sphere of somewhat larger radius than that of the test locations. The coordinate positions of the stand-off locations are defined by the X,Y,Z coordinates of the centre 29A relative to the centre 37A. These coordinates are conveniently pre-determined by manual methods and are listed in the program to be described.

By way of a manual initialisation routine, the operator secures the pivot 37 in a selected position on the table 11 and operates the machine to determine the coordinate position of the centre 37A. To this end the operator moves the head 12 to bring the element 29 sequentially into engagement with three points on the head 38 and initiates a program, held in the computer and known per se for determining the position XC,YC,ZC of the centre 37A in the coordinate field of the machine. Next, the operator determines the position of the centre 29A relative to the centre 37A by a procedure, also known per se, taking into account the radii of the head 38 and the element 29.

Figure 2:
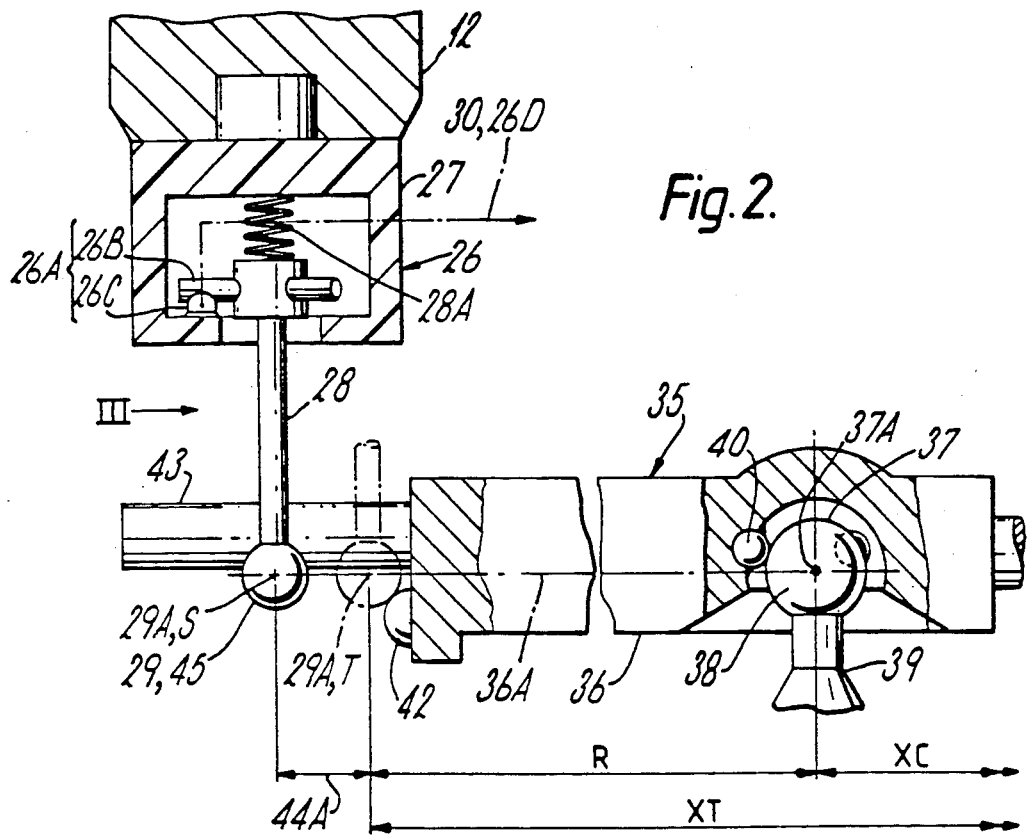
FIG. 2 is an enlarged detail of FIG. 1

Next, the operator places the bar 36 on to the head 38 and moves the head 12 to engage the stylus between the rods 43 all as shown in FIGS. 1 and 2. The operator then moves the head 12 so that the element 29 approximately has the first stand-off location S1, and he starts the automatic part of the operation which is done on the basis of a program held in the computer 31 and now to be described.

Figure 6:
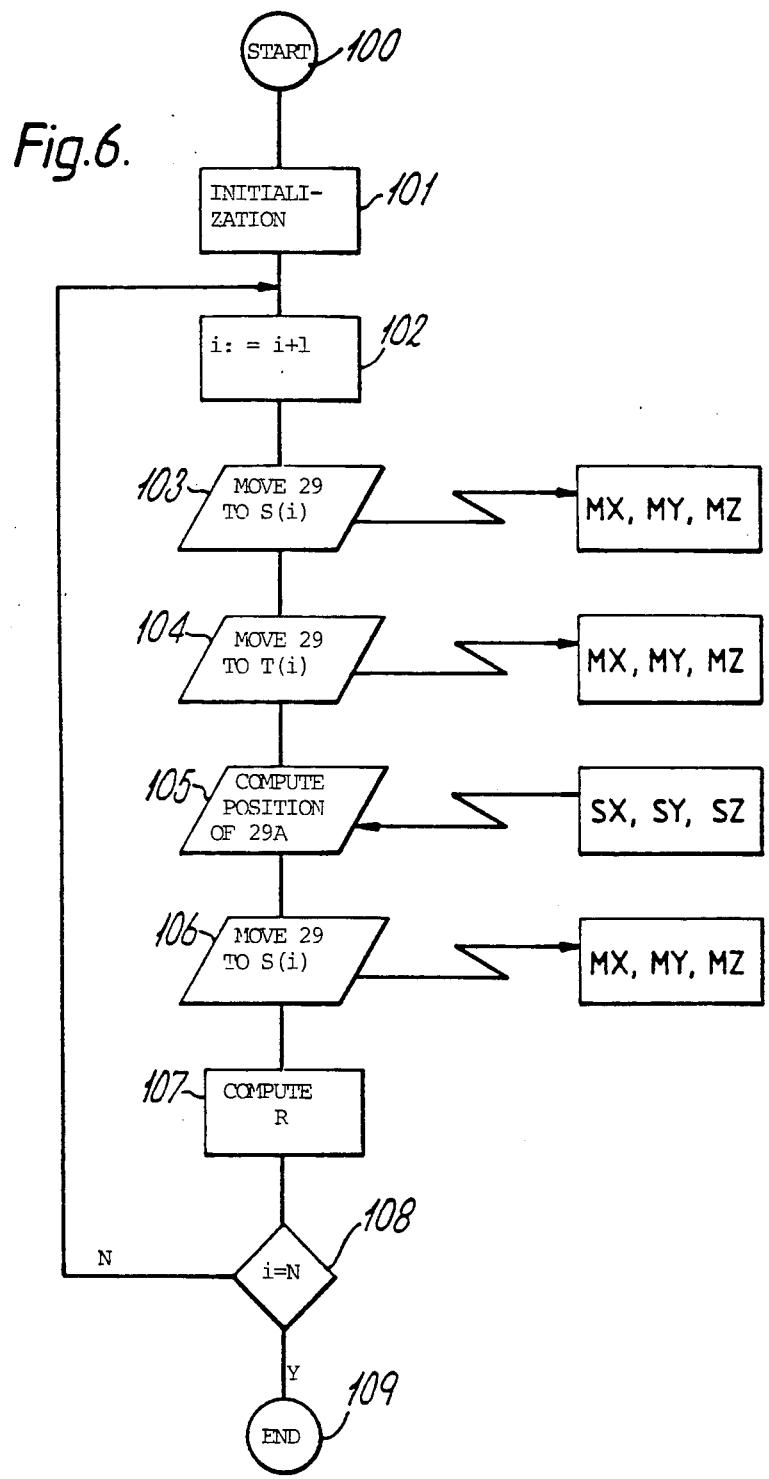
FIG. 6 is a flow diagram of a computer program.

The program comprises the following parameters:
Definitions:
  MX = Motorized movement for X axis
  MY = Motorized movement for Y axis
  MZ = Motorized movement for Z axis
  SX = Output of counter 19
  SY = Output of counter 20
  SZ = Output of counter 21
Constants:
  n = Maximum number of points T to be measured
  XC = X co-ordinate of center 37A
  YC = Y co-ordinate of center 37A
  ZC = Z co-ordinate of center 37A
  XS = Array of X co-ordinates of n stand-off positions of center 29A
  YS = Array of Y co-ordinates of n stand-off positions of center 29A
  ZS = Array of Z co-ordinates of n stand-off positions of center 29A
Variables:
  INDEX = Serial number (0 to n) of array elements
  XT = Array of X co-ordinates of n positions of center 29A
  YT = Array of Y co-ordinates of n positions of center 29A
  ZT = Array of Z co-ordinates of n positions of center 29A Refering now also to FIG. 6, the program comprises the following steps:

100 Start

101 Index: =0. Remark: this initializes the index

102 Index: =index+1. Remark: this increments the index to a current value

103 Move element 29 in a vector to co-ordinates XS(INDEX), YS(INDEX), ZS(INDEX). Remark: this moves the center 29A to the coordinate position of the stand-off location demanded by the current value of the index.

104 Move element 29 in a vector towards center 37A until occurrence of signal 30. Remark: this moves the element 29 toward the plate 42 to produce the signal 30.

105 XT(Index), YT(Index), ZT(index): =SX,SY,SZ. Remark: this determines the coordinate position of the center 29A at the instant of the signal 30.

106 Move probe 29 in a vector to XS(Index, YS(Index), ZS(Index). Remark: this returns the element 29 to the current stand-off position.

107 Calculate R (Index). Remark: this calculates the length R of the bar 36 on the basis of $$R = \sqrt{\{\}XT(\text{Index}) - XC]^2 + [YT(\text{Index}) - YC]^2 + [ZT(\text{Index}) - ZC]^2\}}.$$

108 Repeat from 102 until index=n. Remark: this repeats steps 102 to 107 for each of the positions XS,YS,ZS.

109 End

It will be clear that, in the ideal machine, the values of R would be the same for all test locations T1 to Tn. In an actual machine these values differ and the program may be extended to establish the difference between the highest being a measure of the accuracy of the machine. Another such measure can be established by comparing the values of the X,Y or Z coordinates of all test points which should have identical such values. For example, in FIG. 5 the values of X1 and X8 should be identical but they may differ by a coordinate error, The elevation of such errors is known per se.

I claim:

1. A method of checking the accuracy of orthogonal coordinate positioning apparatus, said apparatus comprising a support, a head supported for three-dimensional movement relative to said support, and continually operable measuring means for measuring the position of said head in terms of three orthogonal coordinates, said method comprising the steps of
providing a test bar having a given fixed length;

universally pivotally connecting one end of said bar to said support and the other end of said bar to said head;

automatically and sequentially moving said head through a plurality of stand-off locations situated about the connection of said bar to said support, said bar undergoing a corresponding angular movement by virtue of its connection to said head;

upon attainment of each said stand-off location moving said head relative to said one end of said bar into a test location; and at each said test location measuring the coordinate position of said head as determined by the length of said bar between the ends thereof.

2. A method according to claim 1 comprising automatically generating a signal responsive to said head attaining any said test location and effecting a reading of said measuring means in response to said signal.

3. A method according to claim 1 wherein the movement of said head takes place relative to said bar.

4. A method according to claim 1 wherein said signal is generated in response to attainment of any said test position during said movement.

5. A device for checking the accuracy of coordinate positioning apparatus, said apparatus comprising a support, a head supported for three-dimensional movement relative to said support, and means for measuring the coordinate position of said head relative to said support, wherein said device comprises a bar;

a connecting member removably securable to said support;

first universal pivot means for supporting said bar at one end thereof on said connecting member;

second universal pivot means adapted for establishing a universal pivotal connection between the other end of said bar and said head; and switch means for producing a signal responsive to said head attaining a predetermined location in a coordinate field of said apparatus.

6. A device according to claim 5 wherein said switch means for producing said signal comprise electric circuit means provided on said head, a member supported on said head for relative movement between first and second positions, means responsive to said member moving between said first and second positions for changing the electrical state of said circuit means, and means for moving said member between said positions in response to the relative movement between said head and said first pivot means.

7. A device according to claim 5 including lost-motion means arranged to permit relative motion between said head and said first pivot means while said head is connected to said bar, and means responsive to said relative motion for producing said signal.

8. A device according to claim 7 wherein said lost-motion means comprise an element connected to said head, a guide means provided on said bar and arranged to guide said element for universal pivotal motion relative to said bar and for linear motion thereon in the direction of the length thereof.

9. A device according to claim 8 comprising an abutment provided on said bar and engageable by said element during said linear motion thereof, and means responsive to said element engaging said abutment for producing said signal.

10. A device according to claim 8 including means permitting disengagement between said element and said guide means.

11. A device according to claim 8 including confronting surface means provided respectively on said element and said guide means, said surface means being configured to constitute a kinematic support between said element and said bar.

12. A device according to claim 7 wherein said lost-motion means comprise means defining a pair of surfaces extending in the direction of the length of said bar and being convergent in the direction transverse to the length of said bar, and a spherical element situated between said convergent surfaces and connected to said head.

13. A device according to claim 5 wherein said first pivot means comprise a head provided on one of said bar and said mounting, and a socket provided on the other one of said bar and said mounting and being engageable with said head.

14. A device according to claim 13 wherein one of said socket and said head constitutes a spherical surface and the other one of said socket and said head comprises three surface elements adapted to engage said spherical surface.

15. A device according to claim 13 wherein said head constitutes a spherical surface and is provided on said mounting.

16. A device for checking the accuracy of coordinate positioning apparatus, said apparatus comprising a support, a head supported for three-dimensional movement relative to said support, and means for measuring the coordinate position of said head relative to said support, said device comprising a bar;

a connecting member removably securable to said support;

first universal pivot means for supporting said bar at one end thereof on said connecting member;

second universal pivot means adapted for establishing a universal pivotal connection between said other end of the bar and said head;

lost motion means provided on said bar for accommodating relative motion of said first and second pivot means between first and second positions spaced in the direction of the length of the bar; and switching means for producing a signal responsive to said first and second pivot means attaining one of said positions.

17. A device for checking the accuracy of coordinate positioning apparatus having a support, a head supported for three-dimensional movement relative to said support, and means for measuring the coordinate position of said head relative to said support, said device comprising a bar;

a connecting member removably securable to said support;

first universal pivot means for supporting the bar at one end thereof on said connecting member;

second universal pivot means adapted for establishing a universal pivotal connection between the other end of said bar and said head;

lost motion means provided between the second pivot means and said other end of the bar, said lost motion means including first and second relatively movable members adapted to accommodate relative motion of the first and second pivot means between first and second positions, and further including a stop provided at one of said members for engagement by the other member for limiting said relative motion; and a switch adapted for producing a signal responsive to said engagement.

18. A device for checking the accuracy of coordinate positioning apparatus having a support, a head supported for three-dimensional movement relative to said support, and means for measuring the coordinate position of said head relative to said support, said device comprising a bar;

a first connecting member connectable to said support;

first universal pivot means for connecting said one end of the bar to said first connecting member;

a second connecting member connectable to said head;

second universal pivot means for connecting the other end of said bar to said second connecting member;

lost motion means provided on said bar for accommodating relative motion of said first and second pivot means between first and second positions spaced in the direction of the length of said bar; and switch means for producing a signal responsive to said first and second pivot means attaining one of said first and second positions.

19. A device according to claim 18 wherein said switch means is provided at said second connecting member.

20. The method of using the apparatus and device claimed in claim 19 comprising the steps of:
   (a) securing said first connecting member to said support;
   (b) securing said second connecting member to said head;
   (c) moving said head by means of said first and second universal pivot means to adopt the second one of said positions;
   (d) moving said head by means of said first and second universal pivot means to adopt the first of said positions thereby generating said signal; and
   (e) measuring the coordinate position of said head at the instant said signal is generated.

21. The method of using the apparatus and device claimed in claim 18 comprising the steps of:
   (a) securing said first connecting member to said support;
   (b) securing said second connecting member to said head;
   (c) moving said head by means of said first and second universal pivot means to adopt the second one of said positions;
   (d) moving said head by means of said first and second universal pivot means to adopt the first of said positions thereby generating said signal; and
   (e) measuring the coordinate position of said head at the instant said signal is generated.

22. A device for checking the accuracy of coordinate positioning apparatus, said apparatus comprising a support, a head movable relative to said support, a stylus having an end connecting to said head and a free end portion, and means for generating a signal when a force is applied to said free end portion, said device comprising a bar;

first pivot means for supporting said bar at one end thereof on said support for universal pivotal motion relative thereto;

means defining two guide surfaces provided at the other end of said bar and extending in the direction of the length thereof; and second pivot means permitting universal pivotal motion between said guide surfaces and said free end portion, said guide surfaces being engageable with said free end portion at opposite sides thereof so as to be slidable relative thereto in the direction of the length of the bar thereby allowing relative motion of said first and second pivot means between first and second positions; and a stop provided at an end of the guide surfaces for engagement by said free end portion thereby effecting said force.

23. The method of using the apparatus and device claimed in claim 22 comprising the steps of:
   (a) securing said first connecting member to said support;
   (b) securing said second connecting member to said head;
   (c) moving said head by means of said first and second universal pivot means to adopt the second one of said positions;
   (d) moving said head by means of said first and second universal pivot means to adopt the first of said positions thereby generating said signal; and
   (e) measuring the coordinate position of said head at the instant said signal is generated.

24. A device for checking the accuracy of coordinate positioning apparatus, said apparatus comprising a support, a head moveable relative to said support, a stylus having one end connected to said head and a spherical sensing element provided at the other end, and means for generating a signal when a force is applied to said sensing element, said device comprising a bar;

first pivot means for supporting the bar at one end thereof on said support for universal pivotal motion relative thereto;

a pair of elongate guide members provided at the other end of said bar, said guide members being spaced apart so as to be engageable along guide surfaces thereof with said stylus at opposite sides thereof, second pivot means permitting universal pivotal motion between the guide surfaces and the spherical sensing element, the guide surfaces being also engageable with said spherical sensing element so as to be slidable thereon in the direction of their length thereby allowing relative motion of said first and second pivot means between first and second positions, said guide surfaces also being supportable on said spherical sensing element so as to allow said universal pivotal motion by virtue of the spherical shape of said sensing element; and a stop provided at an end of said guide surfaces for engagement by said sensing element thereby effecting said force.

25. A device according to claim 24 wherein said stop is fixed in relation to the bar, and said means for sensing said force is provided at said one end of the stylus.

26. The method of using the apparatus and device claimed in claim 25 comprising the steps of:
   (a) securing said first connecting member to said support;

(b) securing said second connecting member to said head;

(c) moving said head by means of said first and second universal pivot means to adopt the second one of said positions;

(d) moving said head by means of said first and second universal pivot means to adopt the first of said positions thereby generating said signal; and (e) measuring the coordinate position of said head at the instant said signal is generated.

27. The method of using the apparatus and device claimed in claim 24 comprising the steps of:

(a) securing said first connecting member to said support;

(b) securing said second connecting member to said head;

(c) moving said head by means of said first and second universal pivot means to adopt the second one of said positions;

(d) moving said head by means of said first and second universal pivot means to adopt the first of said positions thereby generating said signal; and (e) measuring the coordinate position of said head at the instant said signal is generated.

28. Coordinate positioning apparatus adapted for checking the accuracy thereof comprising a head supported for three-dimensional movement relative to said support;

means for measuring the coordinate position of said head relative to said support;

a bar;

first universal pivot means connected between one end of said bar and said support;

second universal pivot means connected between the other end of said bar and said head;

lost motion means for accommodating relative motion of said first and second universal pivot means between positions spaced in the direction of the length of said bar; and switch means for producing a signal responsive to said first and second pivot means attaining one of said positions.

* * * * *